United States Patent
Jung

(10) Patent No.: US 6,243,632 B1
(45) Date of Patent: Jun. 5, 2001

(54) CONTROL CONFIGURATION FOR TRIPPING A RESTRAINT DEVICE IN A VEHICLE IN THE CASE OF A SIDE-IMPACT COLLISION

(75) Inventor: Walter Jung, Bernhardswald (DE)

(73) Assignee: Siemens Aktiengesellschaft, Munich (DE)

( * ) Notice: Subject to any disclaimer, the term of this patent is extended or adjusted under 35 U.S.C. 154(b) by 337 days.

(21) Appl. No.: 08/986,364

(22) Filed: Dec. 8, 1997

Related U.S. Application Data

(63) Continuation of application No. PCT/DE96/00967, filed on May 31, 1996.

(30) Foreign Application Priority Data

Jun. 6, 1995 (DE) ................................. 195 20 608

(51) Int. Cl.$^7$ ................................. G06F 17/00; G06F 7/00
(52) U.S. Cl. ..................... 701/45; 180/268; 180/271
(58) Field of Search ................................. 701/45, 46, 47; 180/268, 271, 282; 280/735; 307/10.1; 340/436

(56) References Cited

U.S. PATENT DOCUMENTS

| | | | |
|---|---|---|---|
| 4,657,314 | * 4/1987 | Leiber | 303/147 |
| 4,979,763 | 12/1990 | Blackbum | |
| 5,083,276 | 1/1992 | Okano et al. | 701/46 |
| 5,216,607 | 6/1993 | Diller et al. | |
| 5,365,114 | * 11/1994 | Tsurushima et al. | 307/10.1 |
| 5,493,270 | * 2/1996 | Kondo | 340/438 |
| 5,513,109 | * 4/1996 | Fujishima | 701/45 |

FOREIGN PATENT DOCUMENTS

| | | |
|---|---|---|
| 3942011A1 | 7/1991 | (DE). |
| 42 22 595 A1 | 1/1993 | (DE). |
| 4222595A1 | 1/1993 | (DE). |
| 0402027A1 | 12/1990 | (EP). |
| 0536624A1 | 4/1993 | (EP). |
| 0590476A2 | 4/1994 | (EP). |
| 6-56000 | 3/1994 | (JP). |
| 89/11986 | 12/1989 | (WO). |

OTHER PUBLICATIONS

"New Sensor Concepts for Reliable Detection of Side–Impact Collision" (Härtl et al.), pp. 1–4.
"Point to Point" (Martin), Automotive Industries, Jul. 1993, pp. 49–51.

* cited by examiner

Primary Examiner—William A. Cuchlinski, Jr.
Assistant Examiner—Gertrude Arthur
(74) Attorney, Agent, or Firm—Herbert L. Lerner; Laurence A. Greenberg; Werner H. Stemer

(57) ABSTRACT

A control configuration for tripping a restraint device in a vehicle includes a sensor device having at least two acceleration sensors, being disposed in a control unit along with a tripping circuit and supplying a longitudinal acceleration signal and a transverse acceleration signal. The tripping circuit supplies an output signal that depends not only on the transverse acceleration signal but also on the longitudinal acceleration signal and thereby enables a reliable decision to be made regarding tripping of the restraint device, despite a weak development of the transverse acceleration signal, due to the central disposition of the sensor device. The output signal is compared with a limit value.

8 Claims, 1 Drawing Sheet

CONTROL CONFIGURATION FOR TRIPPING A RESTRAINT DEVICE IN A VEHICLE IN THE CASE OF A SIDE-IMPACT COLLISION

CROSS-REFERENCE TO RELATED APPLICATION

This application is a continuation of International Application Ser. No. PCT/DE96/00967, filed May 31, 1996, in which the United states was designated.

BACKGROUND OF THE INVENTION

Field of the Invention

The invention relates to a control configuration for tripping a restraint device in a motor vehicle in the case of a side-impact collision, including a sensor device having two acceleration sensors and supplying one longitudinal acceleration signal for accelerations parallel to a longitudinal axis of the vehicle and one transverse acceleration signal for accelerations transverse to the longitudinal axis of the vehicle, and a tripping circuit supplying an output signal determined by the longitudinal acceleration signal and the transverse acceleration signal, for tripping the restraint device if a limit value is exceeded by the output signal.

Control configurations for tripping a restraint device in a front-impact or oblique-impact collision are well known and are installed in motor vehicles on a mass-production basis. An acceleration sensor which is sensitive in the direction of the longitudinal axis of the vehicle detects a negative vehicle acceleration that is caused by a front-impact or oblique-impact collision. A tripping circuit processes the acceleration signal in accordance with an algorithm, which in the simplest case compares the amplitude of the acceleration signal with a limit value, and optionally trips a restraint device, such as driver and passenger-side air bags or belt tighteners. Due to the great distance between the site of impact and the passenger compartment, and because of the energy-absorbing effect of the crumple zone of the vehicle, a relatively long time can elapse before the tripping of the restraint device is permitted by the control configuration without impairing the protection that the restraint device provides to the passengers. That time is utilized to evaluate the acceleration signal. In that process, information is obtained about the severity and type of impact, especially by evaluating the late phases of the acceleration signal, in which the acceleration signal also reaches its maximum amplitude.

In a side-impact collision only a very short time span of a few milliseconds elapses before the control configuration must make the decision whether or not to trip the restraint device, because the distance between the impact site and the passenger compartment is so slight, and an only moderately energy-absorbing crumple zone develops. Within that time span, an acceleration signal which is transverse to the longitudinal axis of the vehicle and is elicited by a side-impact collision, is in its rising phase. The acceleration signal does not reach its maximum amplitude until a later phase. However, the tripping decision must already be made by that time, if the passengers are still to be protected effectively. Until now, acceleration sensors for detecting transverse accelerations have therefore been disposed in the doors, so that the weak acceleration signal can be picked up, near a possible site of a side-impact collision, while still in its first phase, the phase that is decisive for the tripping decision. An acceleration sensor disposed in the central region of the vehicle for picking up transverse accelerations picks up what at least in its first phase is an excessively weak acceleration signal, because of the damping by the vehicle body, and it must then derive a reliable tripping decision from that weak signal. If in the case of a weak acceleration signal, the limit value is necessarily set quite low as a tripping threshold value, then even slight fluctuations in an acceleration signal, or interference signals, can cause undesired tripping. That is why, until now, it appeared impossible for acceleration sensors and a tripping circuit for tripping the restraint device in the event of a side-impact collision to be disposed in a central control unit.

A front-impact or oblique-impact collision is another problem in previously known control configurations for tripping a restraint device in a side-impact collision: Each front-impact or oblique-impact collision also causes an acceleration transverse to the longitudinal axis of the vehicle, which can have a high amplitude especially in the late phases of the front-impact or oblique-impact collision. A transverse acceleration of that kind can lead to tripping of a restraint device intended to provide protection against a side-impact collision. In a side-impact collision involving that transverse acceleration, tripping would be desired, but that is not so in the case of a front-impact or oblique-impact collision.

A control configuration which is known from an article entitled "New Sensor Concepts for Reliable Detection of Side-Impact Collisions", in the Proceedings of the 14th International Technical Conference on Enhanced Safety of Vehicles, pages 1035–1038, has an air pressure sensor located in the vehicle door, that detects a rise in air pressure which occurs in the vehicle door in the event of a side-impact collision as a measure of the acceleration of the vehicle as a consequence of a side-impact collision. The air pressure sensors are connected to a tripping circuit, disposed in the central region of the vehicle, that trips a restraint device, such as side air bags, if the side-impact collision is sufficiently severe.

That kind of control configuration with decentralized sensors, with lines between the tripping circuit and the sensors and with plug connectors, has components which are intensive in terms of material consumption and the testing of which for operability requires considerable effort. Moreover, such a control configuration is expensive to manufacture, assemble, replace and repair.

A control configuration as defined at the outset above is known from German Published, Non-Prosecuted Patent Application DE 42 22 595 A1, corresponding to U.S. Pat. No. 5,202,831. That control configuration has two acceleration sensors, secured to the vehicle and disposed at an angle of 90° from one another, so that the sensor device furnishes one longitudinal acceleration signal for accelerations parallel to the longitudinal axis of the vehicle and one transverse acceleration signal for accelerations transverse to the longitudinal axis of the vehicle. An acceleration vector is calculated from those two acceleration signals, in a tripping circuit. The vector is determined by its magnitude and its angle relative to the longitudinal axis of the vehicle. A restraint device, such as a side air bag, is selected from among a plurality of restraint devices disposed in the vehicle and is tripped, as a function of the acceleration vector.

A control configuration for tripping a restraint device in a vehicle in the event of a front-impact collision is known from an article entitled "Point to Point" by Norman Martin, in "Automotive Industries", July 1993, pages 49–51. To that end, two acceleration sensors at an angle of ±45° from the longitudinal axis of the vehicle are disposed together with a tripping circuit in a common control unit. The restraint device is tripped as a function of the acceleration signals.

A control configuration for tripping a restraint device in a vehicle in a front-impact or oblique-impact collision is known from International Patent Publication WO 89/11986. The control configuration has a sensor device with two acceleration sensors offset by 90° from one another. The sensor device furnishes one longitudinal acceleration signal for accelerations parallel to the longitudinal axis of the vehicle and one transverse acceleration signal for accelerations transverse to the longitudinal axis of the vehicle. The acceleration signals are evaluated both in an analog circuit and in a microprocessor, and they trigger the restraint device as soon as a front-impact or oblique-impact collision is detected as such.

SUMMARY OF THE INVENTION

It is accordingly an object of the invention to provide a compact control configuration for tripping a restraint device in a vehicle in the case of a side-impact collision, which overcomes the herein afore-mentioned disadvantages of the heretofore-known devices of this general type, in which timely tripping of the restraint device in the event of a sufficiently severe side-impact collision is assured in particular, and in which at the same time tripping is prevented in the event of a less-severe side-impact collision or in the event of a front-impact or oblique-impact collision.

With the foregoing and other objects in view there is provided, in accordance with the invention, in a motor vehicle having a longitudinal axis and a restraint device, a control configuration for tripping the restraint device in the case of a side-impact collision, the control configuration comprising a sensor device having two acceleration sensors and supplying a longitudinal acceleration signal for accelerations parallel to the longitudinal axis of the vehicle and a transverse acceleration signal for accelerations transverse to the longitudinal axis of the vehicle; and a tripping circuit connected between the sensor device and the restraint device, the tripping circuit supplying an output signal determined by the longitudinal acceleration signal and the transverse acceleration signal and tripping the restraint device if the output signal exceeds a limit value; the tripping circuit determining the output signal by a quotient of a first signal dependent on the transverse acceleration signal divided by a second signal dependent on the longitudinal acceleration signal.

The sensor device with two acceleration sensors and the tripping circuit are disposed in the same control unit. Timely tripping of a restraint device in a side-impact collision is assured by providing that the sensor device furnishes one longitudinal acceleration signal for accelerations parallel to the longitudinal axis of the vehicle and one transverse acceleration signal for accelerations transverse to the longitudinal axis of the vehicle, and the tripping circuit intrinsically uses the transverse acceleration signal, but also uses the longitudinal acceleration signal. An output signal furnished by the tripping circuit and dependent on the longitudinal acceleration signal and the transverse acceleration signal is compared with a limit value and trips the restraint device if the limit value is exceeded.

Tests have shown that as a consequence of a side-impact collision, the vehicle is also exposed to longitudinal accelerations, having amplitudes which, while substantially less than the amplitudes of the transverse accelerations in the side-impact collision, are still always present, in particular during the first phase of a side-impact collision as well. If that longitudinal acceleration signal is also taken into account in the output signal furnished by the tripping circuit, then a more reliable tripping decision can be made. To that end, the output signal has the quotient of a first signal, which is dependent on the transverse acceleration signal and is weak in the event of a side-impact collision, divided by a second signal, which is dependent on the longitudinal acceleration signal and is substantially weaker in the case of a side-impact collision. The quotient thus has very high values, especially in the initial phase of a side-impact collision, and these very high values can lead to a more reliable tripping decision through the limit value comparison. A transverse acceleration signal caused by a front-impact or oblique-impact collision can also be distinguished from a transverse acceleration signal caused by a side-impact collision, by taking the longitudinal acceleration signal into account in the output signal. Tripping of the restraint device, which is undesirable in the event of a front-impact or oblique-impact collision, is averted.

The control configuration according to the invention is compact, is assembled in only a few steps, and can be maintained and replaced easily. Plug and clamp connections between decentralized sensors, lines, and the tripping circuit are dispensed with.

In accordance with another feature of the invention, the first signal is determined by an energy signal dependent on the transverse acceleration signal, and the second signal is determined by an energy signal dependent on the longitudinal acceleration signal.

In accordance with a further feature of the invention, the output signal is calculated by the following formula:

$$a(t) = \frac{\int_0^t (y^2(t))dt + K1}{\int_0^t (x^2(t))dt + K2}$$

which contains the following variables:
a(t)=the output signal
y(t)=the transverse acceleration signal
x(t)=the longitudinal acceleration signal
K1=a constant
K2=a constant.

In accordance with an added feature of the invention, there is provided a control unit disposed in a central region of the vehicle.

In accordance with an additional feature of the invention, each acceleration sensor is sensitive to two mutually opposite directions.

In accordance with yet another feature of the invention, the first acceleration signal has a sensitivity axis parallel to the longitudinal axis of the vehicle, and the second acceleration signal has a sensitivity axis transverse to the longitudinal axis of the vehicle.

In accordance with yet a further feature of the invention, the tripping circuit is a microprocessor.

In accordance with a concomitant feature of the invention, the sensor device is simultaneously used to trip a restraint device in a vehicle in the case of a front-impact or oblique-impact collision.

Other features which are considered as characteristic for the invention are set forth in the appended claims.

Although the invention is illustrated and described herein as embodied in a control configuration for tripping a restraint device in a vehicle in the case of a side-impact collision, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
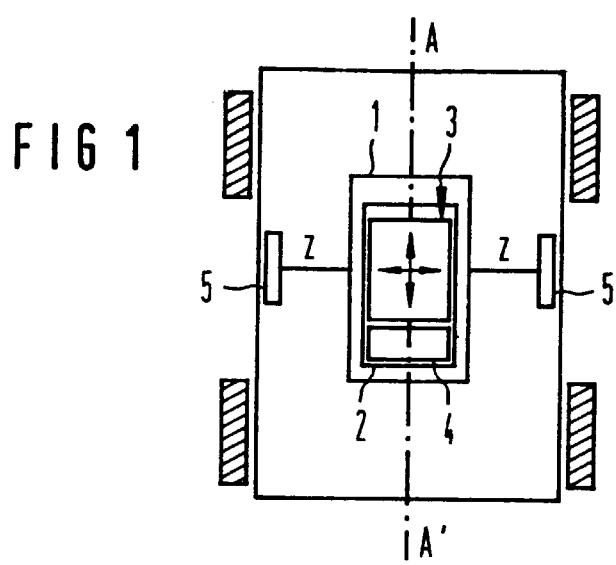
FIG. 1 is a diagrammatic, top-plan view showing a disposition of a control unit with a control configuration of the invention in a motor vehicle.

Referring now to the figures of the drawings in detail and first, particularly, to FIG. 1 thereof, there is seen a vehicle with a control unit 1, which includes a control configuration 2 with a sensor device 3 and a tripping circuit 4. Ignition signals z are transmitted over lines from the control configuration 2 to a restraint device 5. Sensitivity axes of two acceleration sensors are shown symbolically on the sensor device 3. A first acceleration sensor furnishes a longitudinal acceleration signal having a sensitivity axis extending parallel to a longitudinal axis A–A' of the vehicle. A second acceleration sensor furnishes a transverse acceleration signal having a sensitivity axis which extends transversely to the longitudinal axis A–A' of the vehicle. The control unit 1 is disposed in a central region of the vehicle.

Figure 2:
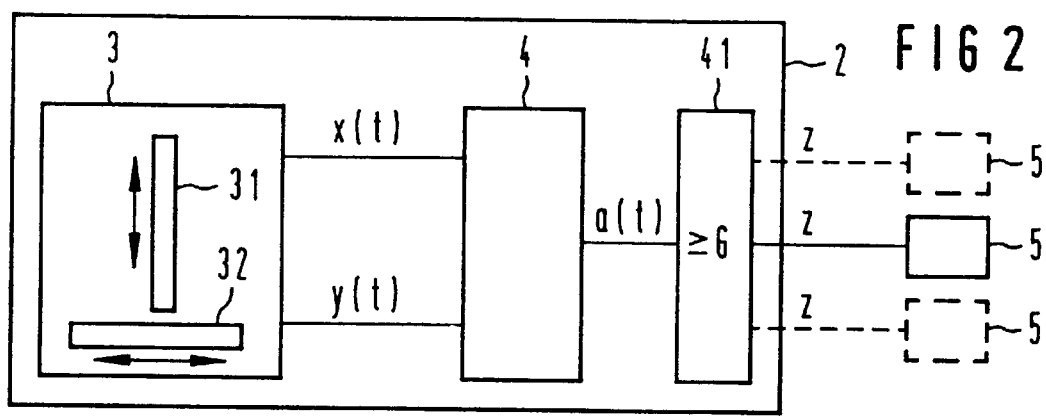
FIG. 2 is a block circuit diagram of the control configuration of the invention.

FIG. 2 shows a block circuit diagram of the control configuration 2 with the sensor device 3, which furnishes a longitudinal acceleration signal x(t) to the tripping circuit 4. The tripping circuit 4 furnishes an output signal a(t) to a comparator 41. If the output signal a(t) exceeds a limit value G, then the ignition signals z are transmitted to the restraint devices 5.

The sensor device 3 has at least two acceleration sensors 31 and 32. They are disposed arbitrarily in spatial terms, on the condition that the sensor device 3 furnishes the longitudinal acceleration signal x(t) for accelerations parallel to the longitudinal axis A–A' of the vehicle and the transverse acceleration signal y(t) for accelerations transverse to the longitudinal axis A–A' of the vehicle. The acceleration sensors 31 and 32 preferably have sensitivity axes that are oriented parallel and transverse to the longitudinal axis A–A' of the vehicle, as is also shown symbolically in FIG. 1. However, a configuration of the acceleration sensors 31, 32 with an angle of ±45° or some other angle to the longitudinal axis A–A' of the vehicle is also possible: The longitudinal acceleration signal x(t) and the transverse acceleration signal y(t) are then ascertained through corresponding angular functions from the signals of the acceleration sensors 31 and 32.

The acceleration sensors 31 and 32 furnish analog or at least quasi-analog signals. They may operate on the capacitive, piezoresistive, piezoelectric, or some other principle. Each acceleration sensor may also be constructed from diverse acceleration switches with different response thresholds. Binary signals of the various acceleration switches are combined into one quasi-analog acceleration signal.

The acceleration sensors 31 or 32 are preferably constructed in a bipolar manner. In other words, each acceleration sensor is sensitive for two opposed directions. For instance, the acceleration sensor 32, with its sensitivity axis crosswise to the longitudinal axis A–A' of the vehicle, may detect accelerations caused by a side-impact collision from the left as well as from the right. As an alternative, unipolar acceleration sensors may also be used, on the condition that the sensor device 3 furnishes the longitudinal acceleration signal x(t) and the transverse acceleration signal y(t).

If integrated acceleration sensors 31 or 32 are used, then the acceleration sensors can be produced together with the tripping circuit 4 on a semiconductor chip.

The tripping circuit 4 may be constructed as an analog circuit or as a microprocessor. The output signal a(t) that it furnishes is compared with the limit value G, and the sensitivity of the control configuration 2 is adjusted through the limit value G. If the output signal a(t) exceeds the limit value G, then an ignition command z is transmitted to at least one restraint device 5, preferably side air bags on the driver and passenger side, or another device for protecting the passengers in the case of a side-impact collision.

The output signal a(t) is preferably compared with a plurality of different limit values G, in order to trip a plurality of different restraint devices or a plurality of stages of a multistage restraint device, such as the chambers of a side air bag, as a function of the severity of the side-impact collision, and thus with staggered timing.

The tripping circuit 4 preferably includes a further circuit unit, which trips only certain restraint devices as a function of the longitudinal acceleration signal x(t) and the transverse acceleration signal y(t). For instance, in a side-impact collision on the driver side, only a restraint device located on the driver side is tripped, but not a restraint device on the passenger side.

Figure 3:
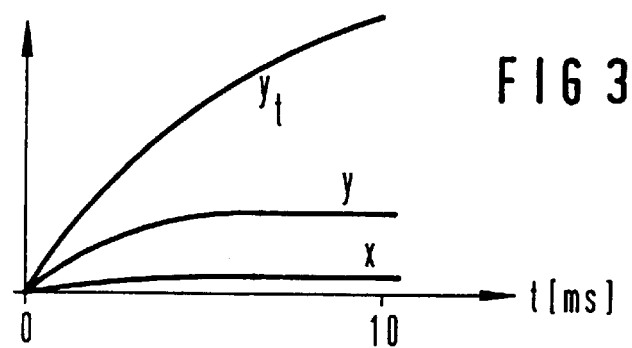
FIG. 3 is a graph showing longitudinal and transverse acceleration of a vehicle that occur within a first 10 ms from an onset of a side-impact collision.

According to the invention, the tripping circuit 4 furnishes an output signal a(t) that depends not only on the transverse acceleration signal y(t) but also on the longitudinal acceleration signal x(t). FIG. 3 qualitatively shows longitudinal and transverse accelerations x and y acting on a vehicle in the first milliseconds from the onset of a side-impact collision. The longitudinal acceleration signal x(t) is itself clearly perceptible in a side-impact collision that occurs at a 90° angle to the longitudinal axis A–A' of the vehicle, yet this signal develops very weakly. The transverse acceleration signal y(t) which is picked up in the first milliseconds of the side-impact collision by the central sensor device 3, is weakly developed in comparison to a transverse acceleration signal "door" yt(t), which is picked up by an acceleration sensor located in the affected vehicle door.

The transverse acceleration signal y(t), compared with a limit value, in contrast to the transverse acceleration signal "door" yt(t), does not lead to a reliable tripping decision: the limit value, as a tripping threshold, must necessarily be set quite low. Even slight fluctuations in an acceleration signal, or interference signals, can therefore cause undesired tripping.

Preferably, a first signal dependent on the transverse acceleration signal y(t) is formed and referred to a second signal dependent on the longitudinal acceleration signal x(t). This exploits the fact that the quotient of the first signal, with a relatively low amplitude, to the second signal with a very low amplitude furnishes the output signal a(t) with a very high amplitude, which is compared with the limit value G and thus furnishes a reliable tripping decision. Moreover, a transverse acceleration signal y(t) caused by a front-impact or oblique-impact collision definitively does not cause tripping of the restraint device 5, since a high longitudinal acceleration signal x(t) in the numerator of the quotient prevents the output signal a(t) from exceeding the limit value G.

Preferably, the first signal is an energy signal dependent on the transverse acceleration signal y(t), and the second signal is an energy signal dependent on the longitudinal acceleration signal x(t). The energy signals describe the breakdown of energy over time for the energy transmitted to the vehicle in the longitudinal and transverse directions by a side-impact collision, from the onset of the side-impact collision. The signal spacing between the first signal and the second signal and thus the amplitude of the quotient are increased by using energy signals: This makes the limit value decision more reliable.

High-frequency fluctuations in the acceleration signals are smoothed out by chronologically adding up the differential energy amounts. Moreover, the chronological prehistory of the acceleration signals is taken into account.

The first signal preferably includes an additive constant K1, and the second signal preferably includes an additive constant K2. The tripping decision is adapted to the particular application or the particular vehicle type through the constants K1 and K2 and the limit value G.

The output signal a(t) is preferably calculated by the following formula:

$$a(t) = \frac{\int_0^t (y^2(t))dt + K1}{\int_0^t (x^2(t))dt + K2}$$

The tripping circuit 4, with an arbitrary configuration of acceleration sensors in the sensor device 3, may also be a microprocessor and may be disposed simultaneously with the sensor device 3 in the same control unit 1 in a central region of the vehicle.

The centrally disposed sensor device 3, along with the longitudinal acceleration signal x(t) and the transverse acceleration signal y(t) and given an arbitrary configuration of the acceleration sensors 31 and 32, moreover furnishes signals that can also be used for detecting a front-impact or oblique-impact collision because of the evaluation by the tripping circuit.

I claim:

1. In a motor vehicle having a longitudinal axis and a restraint device, a control configuration for tripping the restraint device in the case of a side-impact collision, the control configuration comprising:

a sensor device having two acceleration sensors and supplying a longitudinal acceleration signal for accelerations parallel to the longitudinal axis of the vehicle and a transverse acceleration signal for accelerations transverse to the longitudinal axis of the vehicle; and a tripping circuit connected between said sensor device and the restraint device, said tripping circuit supplying an output signal a(t) determined by the longitudinal acceleration signal and the transverse acceleration signal and tripping the restraint device if the output signal exceeds a limit value;

said tripping circuit determining the output signal a(t) by a quotient of a first signal dependent on the transverse acceleration signal to a second signal dependent on the longitudinal acceleration signal.

2. The control configuration according to claim 1, wherein the first signal is determined by an energy signal dependent on the transverse acceleration signal, and the second signal is determined by an energy signal dependent on the longitudinal acceleration signal.

3. The control configuration according to claim 1, wherein the output signal is calculated by the following formula:

$$a(t) = \frac{\int_0^t (y^2(t))dt + K1}{\int_0^t (x^2(t))dt + K2}$$

which contains the following variables:

a(t)=the output signal y(t)=the transverse acceleration signal x(t)=the longitudinal acceleration signal K1=a constant K2=a constant.

4. The control configuration according to claim 1, including a control unit disposed in a central region of the vehicle.

5. The control configuration according to claim 1, wherein each acceleration sensor is sensitive to two mutually opposite directions.

6. The control configuration according to claim 1, wherein the first acceleration signal has a sensitivity axis parallel to the longitudinal axis of the vehicle, and the second acceleration signal has a sensitivity axis transverse to the longitudinal axis of the vehicle.

7. The control configuration according to claim 1, wherein said tripping circuit is a microprocessor.

8. The control configuration according to claim 1, wherein said sensor device is simultaneously used to trip a restraint device in a vehicle in the case of a front-impact or oblique-impact collision.

* * * * *